(12) United States Patent
Hubbes (10) Patent No.: US 10,556,263 B2
(45) Date of Patent: Feb. 11, 2020

(54) DEFORMATION METHOD AND PRESS

(71) Applicant: Hilmar Hubbes, Lage (DE)

(72) Inventor: Hilmar Hubbes, Lage (DE)

(*) Notice: Subject to any disclaimer, the term of this patent is extended or adjusted under 35 U.S.C. 154(b) by 211 days.

(21) Appl. No.: 15/562,715

(22) PCT Filed: Feb. 24, 2016

(86) PCT No.: PCT/DE2016/000076
§ 371 (c)(1),
(2) Date: Sep. 28, 2017

(87) PCT Pub. No.: WO2016/155689
PCT Pub. Date: Oct. 6, 2016

(65) Prior Publication Data
US 2018/0117654 A1 May 3, 2018

(30) Foreign Application Priority Data
Mar. 31, 2015 (DE) .................. 10 2015 004 108

(51) Int. Cl.
*B21D 26/02* (2011.01)
*B21D 22/02* (2006.01)
(Continued)

(52) U.S. Cl.
CPC ......... *B21D 22/022* (2013.01); *B21D 26/039* (2013.01); *B21J 9/12* (2013.01);
(Continued)

(58) Field of Classification Search
CPC .. B21D 22/022; B21D 26/039; B29C 59/002; B29C 59/02; B30B 1/16; B30B 15/0029;
(Continued)

(56) References Cited

U.S. PATENT DOCUMENTS 2,105,053 A * 1/1938 Patrick ...................... B30B 1/08
100/271
2,780,117 A * 2/1957 Bauer ......................... B21J 9/12
100/272
(Continued)

FOREIGN PATENT DOCUMENTS

CN 201 823 859 5/2011
DE 35 17 492 5/1986
(Continued)

*Primary Examiner* — David B Jones
(74) *Attorney, Agent, or Firm* — Cozen O'Connor (57) ABSTRACT

In a forming process with a press having in a frame a ram closing through the force of a cylinder with a moveable piston against a press table in a straight-line movement, the piston initially acts upon at least one knuckle joint system during the closing of the press, and a hydraulic cushion of the ram concludes the closing process with extension of the knuckle joint system in movement direction of the piston and straight-line support thereof against the frame. In a press having in a frame a ram closing through the force of a cylinder with a moveable piston against a press table in a straight-line movement, the ram is connected so as to be fixed with respect to the frame via at least two identically constructed knuckle joint systems, and the ram has a hydraulic cushion.

10 Claims, 7 Drawing Sheets

(51) Int. Cl.
  *B22D 17/26* (2006.01)
  *B21D 26/039* (2011.01)
  *B21J 9/12* (2006.01)
  *B30B 1/16* (2006.01)
  *B30B 1/10* (2006.01)
  *B30B 1/08* (2006.01)
  *B30B 15/00* (2006.01)
  *B29C 59/00* (2006.01)
  *B29C 59/02* (2006.01)

(52) U.S. Cl.
  CPC ............ *B22D 17/26* (2013.01); *B29C 59/002* (2013.01); *B29C 59/02* (2013.01); *B30B 1/08* (2013.01); *B30B 1/10* (2013.01); *B30B 1/106* (2013.01); *B30B 1/16* (2013.01); *B30B 15/0029* (2013.01)

(58) Field of Classification Search
  CPC .. B30B 1/106; B30B 1/10; B30B 1/08; B22D 17/26; B21J 9/12
  USPC .......................................................... 72/373
  See application file for complete search history.

(56) References Cited

U.S. PATENT DOCUMENTS

| | | | | |
|---|---|---|---|---|
| 3,205,551 A | * | 9/1965 | Welter | B22D 17/26 100/286 |
| 4,302,961 A | * | 12/1981 | Leinhaas | B30B 1/10 72/451 |
| 4,850,272 A | * | 7/1989 | Leinhaas | B30B 1/106 100/286 |
| 5,600,995 A | * | 2/1997 | Sherman | B21H 7/16 72/220 |
| 7,124,618 B1 | * | 10/2006 | Ghiran | B21D 26/039 72/451 |

FOREIGN PATENT DOCUMENTS

| | | |
|---|---|---|
| DE | 202 16 874 | 2/2003 |
| DE | 10 2004 046493 | 3/2006 |
| DE | 10 2011 055 630 | 6/2012 |

* cited by examiner

DEFORMATION METHOD AND PRESS

CROSS REFERENCED TO RELATED APPLICATIONS

This is a U.S. national stage of application No. PCT/DE2016/000076, filed on Feb. 24, 2016. Priority is claimed on German Application No. DE102015004108.8, filed Mar. 31, 2015, the content of which is incorporated here by reference.

BACKGROUND OF THE INVENTION

1. Field of the Invention

The invention is directed to a forming process, particularly a hot-forming process, and to a press in which there is provided in a frame a ram closing through the force of a cylinder with a moveable piston against a press table in a straight-line movement.

2. Description of the Prior Art

There are diverse embodiment forms of known and proven presses. Hydraulically operated presses in particular have a broad spectrum of application. Mechanically operated presses, on the other hand, are often of a specific nature. Thus mechanically operated knuckle joint presses are usually only used in book printing or as fruit presses.

Combination forms of hydraulic systems with mechanical knuckle joint presses are certainly also known, for example, from DE 10 2011 055 630 A1.

SUMMARY OF THE INVENTION

In spite of the multiplicity of known types of presses, there is a need in forming technology, specifically in hot-forming technology, to have access to a press which closes quickly and which can also work up the high force necessary for this purpose.

This set of technical problems is solved by a forming process with a press having in a frame a ram closing through the force of a cylinder with a moveable piston against a press table in a straight-line movement through the step in which the piston initially acts upon at least one knuckle joint system during the closing of the press and in which a hydraulic cushion of the ram concludes the closing process with extension of the knuckle joint system in movement direction of the piston and linear support thereof against the frame.

The forming process according to one aspect of the invention has a number of advantages which are based on dividing the forming of a workpiece into two forming portions. Accordingly, a fast closing process of the press is initiated through the transference of the force of the cylinder to the at least one knuckle joint system. If the knuckle joint system is then extended and the ram can be supported against the frame, the forming process is concluded through the hydraulic cushion of the ram under high force.

A further advantage results from the step in which the hydraulic cushion is initially moved out during the closing of the press, the hydraulic cushion is moved in with impingement on a workpiece, and after extension of the at least one knuckle joint system the hydraulic cushion, which moves out again, concludes the forming process.

When the hydraulic cushion impinges on a workpiece, hydraulic fluid is displaced from the cylinder of the hydraulic cushion, and only a small amount of hydraulic fluid need then impinge upon the hydraulic cushion after extension of the at least one knuckle joint system.

In a press of the type mentioned above, which is suitable particularly for this process, the advantages are realized when it is provided that the ram is connected so as to be fixed with respect to the frame via at least two identically constructed knuckle joint systems and that the ram has a hydraulic cushion.

The press according to aspects of the invention likewise has a number of advantages.

When using a fast-stroke piston, initial closing speeds of the knuckle joint systems of 800 mm/s to 900 mm/s can be achieved. Further, the control of the one cylinder can be kept simple because the knuckle levers are connected in parallel and a deformation during the pressing process can be ruled out to a great extent through a sufficient dimensioning or a sufficient quantity of knuckle joint systems. A very uniform pressure can also be worked up via the ram through the arrangement of and/or the quantity of knuckle levers.

When the knuckle joint systems are extended and can accordingly, through their extension, transmit high forces to the frame of the press, the concluding forming of a workpiece takes place through the moving out of the hydraulic cushion which, to this end, can have, e.g., six hydraulic cylinders so as to be adapted to the stated object.

In a constructional configuration, it is provided that a knuckle joint system has a lever which is connected at a first end via a first rotational axis to the ram, that a T-shaped knuckle lever is connected at one end of the continuous leg to the second end of the lever via a second rotational axis, that the continuous leg is connected at the other end via a third rotational axis in a receptacle which is fixed with respect to the frame, and the three rotational axes lie in a line in movement direction of the ram in the closed position of the press, and that the free end of the extending leg of the knuckle lever is connected at one end via a fourth rotational axis to a connection lever, which is connected at the other end to the one piston via a fifth rotational axis.

Further, it has proven advisable that the height of the receptacles over the press table is adjustable. A correspondingly constructed long cylinder and the vertical adjustability thereof make it possible to adapt to workpieces and dies of different dimensions in a simple manner.

In a further development, it can be provided that the receptacles are arranged at the free ends of threaded spindles, particularly with a trapezoidal thread, which extend in movement direction of the ram. They can then be fixed in spindle nuts, e.g., in a top flange of the frame joining two uprights, so as to be adjustable with respect to height and, e.g., can be actuated by motor. A hydraulic locking mechanism can then secure the height adjustment.

The geometry of the knuckle joint system aims primarily at a fast closing of the press. Therefore, it is provided that the distances between the first rotational axis and the second rotational axis and between the second rotational axis and the third rotational axis are equal. Accordingly, these lever portions form an isosceles triangle when the press is open. In a corresponding manner, uniform loads also take place during a closing of the press.

The step by which the second rotational axis and the fourth rotational axis are arranged on a circular path around the third rotational axis can also be useful for this purpose.

In order for the hydraulic cushion of the ram to be uniformly loaded by the knuckle joint system, it can be provided that at least three knuckle joint systems are arranged so as to have uniform pitch on a circular path centrally over the hydraulic cushion, which is possibly circular in cross section, with inwardly directed, extending legs of the knuckle levers, and that the free ends of the knuckle levers are connected via the connection lever to a common platform fixed with respect to the piston.

There are preferably provided at least two knuckle joint systems arranged with extending legs of the knuckle levers directed towards one another over the ram, and the free ends of the extending legs of the knuckle levers are connected via the connection lever to a common platform which is fixed with respect to the piston. If four knuckle joint systems are intended, they are arranged in two pairs extending adjacent to one another.

An arrangement of this kind is used with comparatively large rectangular hydraulic cushions, in which case the application of the knuckle joint systems takes place in the corners of the hydraulic cushion.

Regardless of the arrangement of the knuckle joint systems, it is provided that webs to which the connection levers are rotatably connected project from the underside of the platform.

In a circular arrangement of the knuckle levers, the webs will extend in a star-shaped manner and intersect in the center of the platform. In case of four knuckle levers, two parallel webs are to be provided.

In view of the high forces to be transmitted, it can further be provided that the levers are formed by double levers. However, it is preferable that connections between levers, receptacles and/or webs are formed in a pincer-like manner in that a first part to be connected is enclosed by two brackets of the second part which is partially U-shaped in cross section, and in that the two parts are connected by a pin in aligned bore holes as rotational axis.

It is then possible in a further constructional configuration that one end of the first portion is weakened to form a neck and is provided with a rounding, that two flat sides extending perpendicular to the neck are formed by the weakening, that the front sides of the rounded brackets of the second portion lie on the flat sides in the closed position of the press, and that, during an opening or closing of the press and a resulting deflection of the portions toward one another, the roundings of the brackets roll on the flat sides and the roundings of the necks roll on the groove base formed by the brackets and/or roundings on surfaces which are fixed with respect to the piston or with respect to the ram.

This has the advantage that the transmission of force during a closing of the press does not take place solely along the axes but rather as a result of the levers being supported directly on one another.

BRIEF DESCRIPTION OF THE DRAWINGS

The invention will be described more fully with reference to the drawings in which only an embodiment example is depicted schematically. The drawings show:

FIG. 17 is the press with locked knuckle joint systems and with inner box of the hydraulic cushion moved in.

DETAILED DESCRIPTION OF THE PRESENTLY PREFERRED EMBODIMENTS

Figure 1:
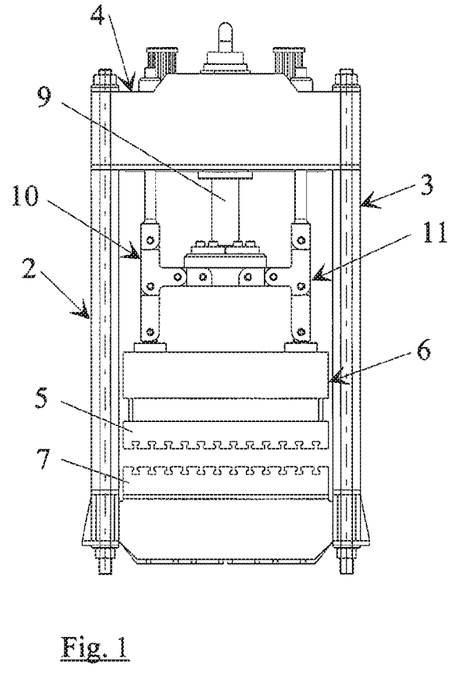
FIG. 1 is a front view of a press according to the invention.
Figure 2:
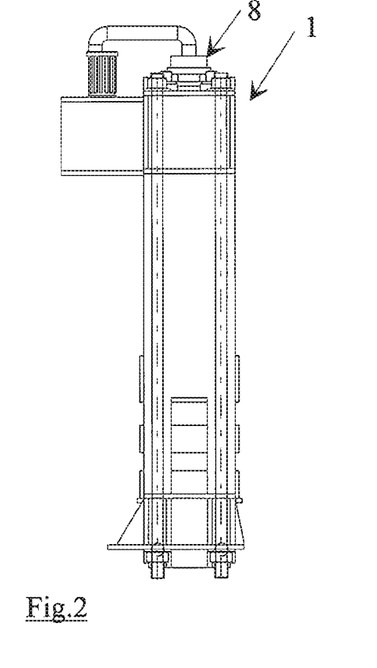
FIG. 2 is a side view.
Figures 3, 4:
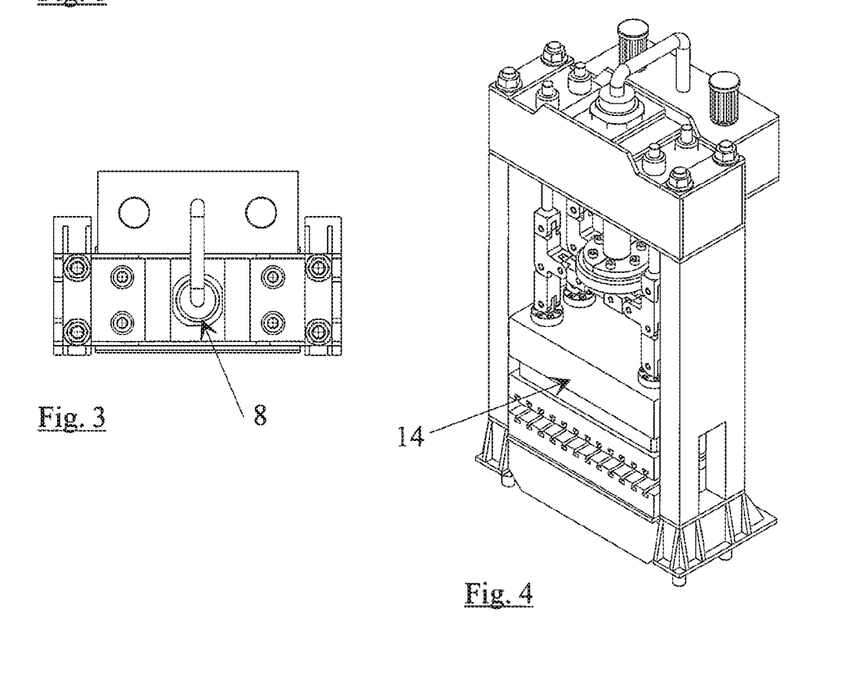
FIG. 3 is a top view.
FIG. 4 is an isometric diagram.

A press 1 according to one aspect of the invention is shown in a view from three sides in FIGS. 1-3. The press 1 has a portal-type construction, conventional per se, with two uprights 2, 3 and an upper flange 4 of a press frame connecting the uprights 2, 3.

FIG. 1 shows the press 1 in a closed position in which an upper die 5 of a ram 6 is moved against a lower die 7 of a press table. A hydraulic cylinder 8, which is fixed in the upper flange 4, is provided for adjusting the ram 6, the piston 9 thereof acting on identically constructed knuckle joint systems 10, 11, of which there are four in this instance, see FIGS. 15-18.

A comparatively long double-cylinder which is designed for very fast stroke movements is preferably used as cylinder 8 so that the dies 5, 7 can be closed quickly particularly for hot-forming of a workpiece via the knuckle joint systems 10, 11.

The ram 6 further has a two-housing hydraulic cushion 14 at the underside of which the upper die 5 is fixed. FIG. 1 shows the hydraulic cushion 14 moved out, and the upper die 5 is therefore in its bottommost position.

Every knuckle joint system 10, 11 has a first lever 15 which is connected at a first end 16, in this instance a lower end 16, to the hydraulic cushion 14 of the ram 6 via a rotational axis 17.

Figure 5:
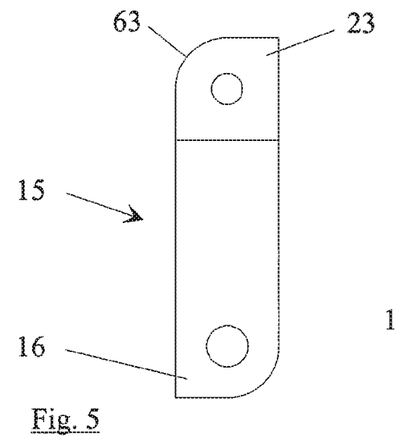
FIG. 5 is a front view of a lever shown in isolation.
Figure 6:
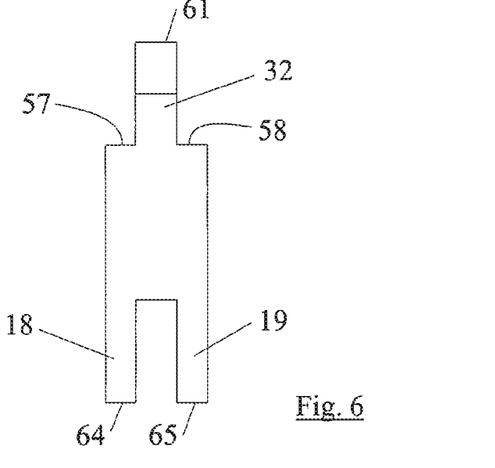
FIG. 6 is a side view.
Figures 7, 8:
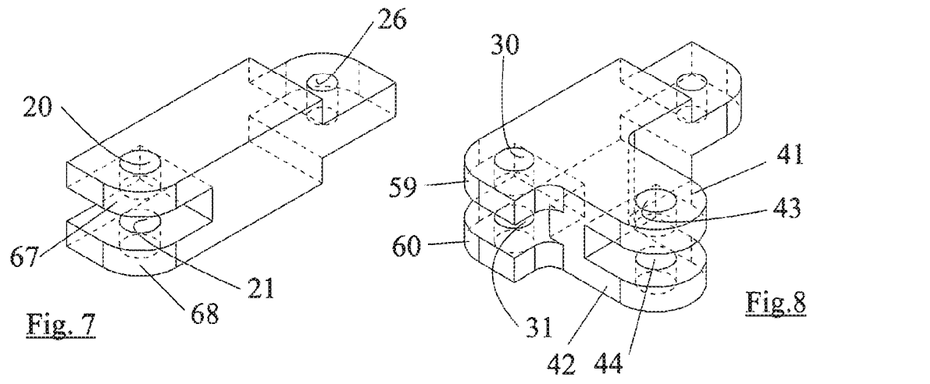
FIG. 7 is an isometric diagram.
FIG. 8 is an isometric diagram of a knuckle lever.
Figure 11:
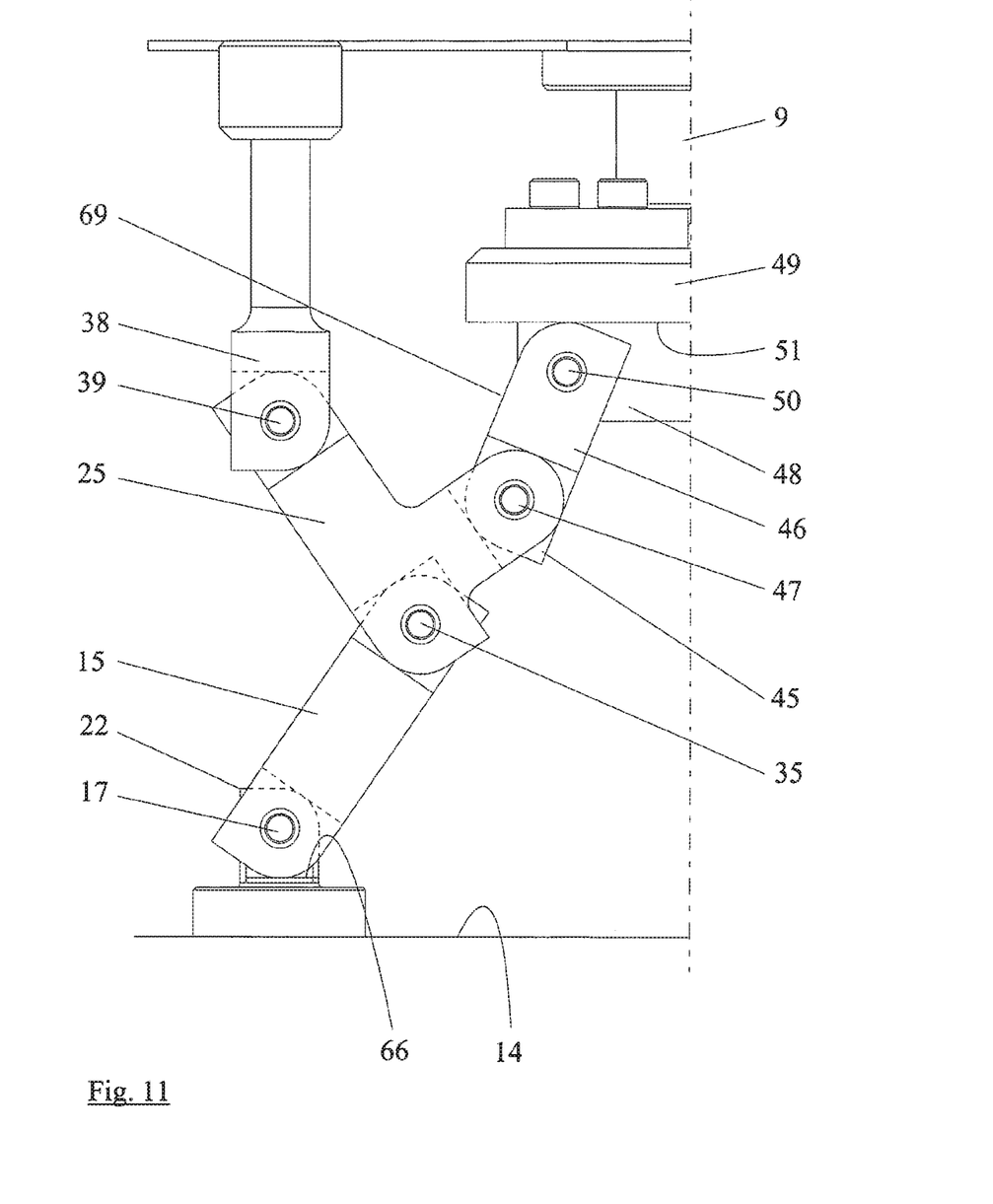
FIG. 11 is a front view of a deflected knuckle joint system.

For this purpose, the first end 16 of lever 15 has a U-shaped cross section, see FIGS. 5-7, so that two brackets 18, 19 with aligned bore holes 20, 21 can enclose a neck 22 which projects from the top side of the hydraulic cushion 14 and which has a further bore hole so as to be connected through an inserted pin as rotational axis 17, see FIG. 11.

Figure 9:
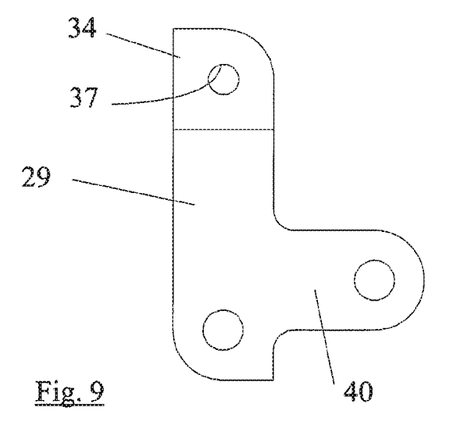
FIG. 9 is a front view.
Figure 10:
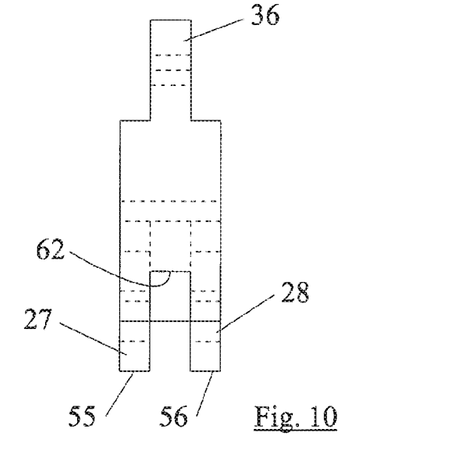
FIG. 10 is a side view.

For connecting the second end 23 of lever 15 to a knuckle lever 25 according to FIGS. 8-10, this end 23 is weakened to form a neck 32 viewed from the side according to FIG. 6 and is provided with a bore hole 26. The neck 32 is enclosed by two brackets 27, 28 of the continuous leg 29 of knuckle lever 25, which likewise again have aligned bore holes 30, 31. The lever 15 and the knuckle lever 25 are connected to one another in an articulated manner by a pin inserted into the aligned bore holes 26, 30, 31 as rotational axis 35.

The other end 34 of the continuous leg 29 of knuckle lever 25 is again weakened to form a neck 36 and is provided with a bore hole 37 for connecting so as to be fixed with respect to the frame. The neck 36 is enclosed by two brackets with aligned bore holes of a receptacle 38, and a connection is carried out by a pin as rotational axis 39.

Two brackets 41, 42, which are provided with aligned bore holes 43, 44, are formed by the extending leg 40 of knuckle lever 25. The brackets 41, 42 enclose a neck 45 of a connection lever 46 with a corresponding bore hole, and the articulated connection is carried out via a pin as rotational axis 47.

The connection lever 46 connected to the extending leg 40 of knuckle lever 25 also encloses a web 48 in the manner described above by two brackets in a pincer-like manner, which web 48 projects from the underside of a platform 49 fixed with respect to the piston, and the connection lever 46 is swivelably connected to this web 48 via a pin as rotational axis 50.

Figure 12:
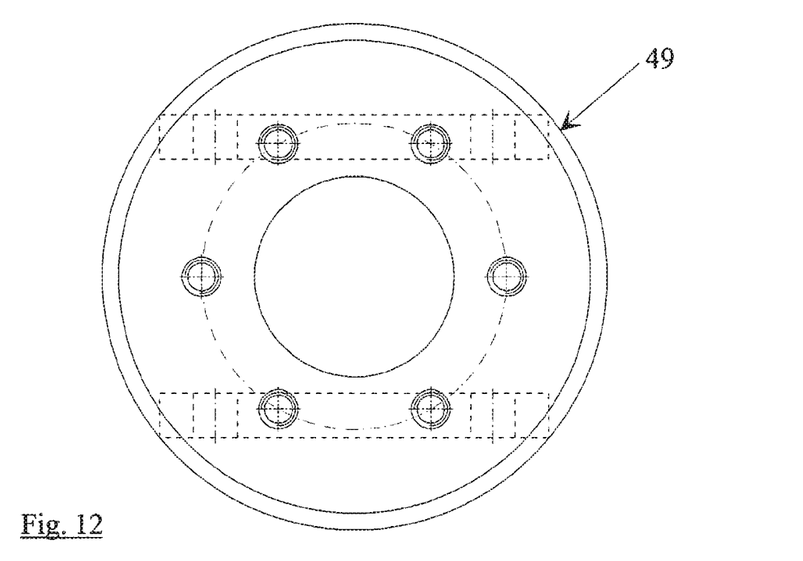
FIG. 12 is a top view of a platform.
Figure 13:
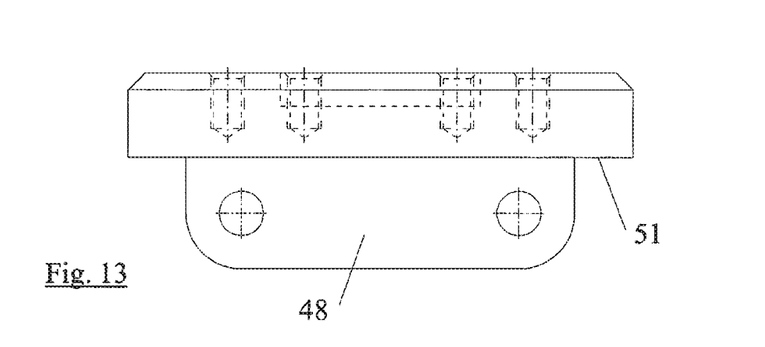
FIG. 13 is a first side view.
Figure 14:
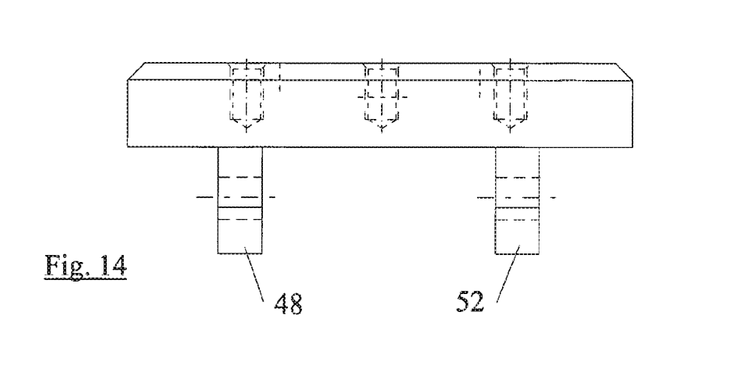
FIG. 14 is a second side view.

Since four knuckle joint systems 10, 11 are provided in the embodiment example that are arranged over the hydraulic cushion 14 in pairs with extending legs 40 of knuckle levers 25 directed toward one another, the common platform 49 has two parallel webs 48, 52 projecting from the underside 51 as is shown again in FIGS. 12 to 14.

Since the knuckle joint systems are arranged so as to have a uniform pitch on a circular path centrally above the hydraulic cushion with inwardly directed, extending legs of the knuckle levers, the webs intersect in the center on the underside of the platform.

The transfer of force between piston 9 and hydraulic cushion 14 does not take place exclusively via rotational axes 17, 35, 39, 47, 50. Rather, FIG. 11 in particular shows that the connections of levers 15, 25, 46 are adapted to one another at the ends so as to fit precisely.

Accordingly, for example, the front sides 55, 56 of the brackets 27, 28 of knuckle lever 25 are supported on the front flat sides 57, 58 of the lever 15 that extend perpendicular to the neck 32. In order to be swiveled out of the position of the closed dies 6, 7 shown in FIG. 1 for opening, the corners of the brackets 27, 28 are provided with roundings 59, 60 which roll when swiveled on the flat sides 49, 50 of the lever 15.

On the other hand, the front side 61 is supported at the upper end 16 of the lever 15 on the groove base 62 between the brackets 55, 56 of the knuckle lever 25, and the front side 61 is provided with a rounding 63 rolling on the groove base 62 for swiveling.

The connection of the knuckle lever 25 to the receptacle 38 and connection lever 46, respectively, is carried out in an identical manner.

The connection of the lower end 16 of the lever 15 to the neck 22 is also comparable. The front sides 64, 65 of the brackets 18, 19 are supported on correspondingly constructed surfaces 66 of the hydraulic cushion 14 and can roll on the latter during a deflection owing to the roundings 67, 68.

This also applies correspondingly to the connection of the connection lever 46 to the web 48. The rounding of the front sides of the brackets, which allows the swiveling of the connection lever around the rotational axis 50, rolls on the underside 51 of the platform 49.

Further, the above-described type of connections has the advantage that they are self-locking. A further deflection of the levers is impossible via the extended arrangement of the levers which is shown in FIG. 1. Accordingly, the connection lever 46, for example, locks as a result of its narrow side 69 contacting the underside 51 of the platform 49. Likewise, levers 15, 25 can only be deflected toward the right, only in FIG. 1, in direction of the extending lever 40.

Figure 26:
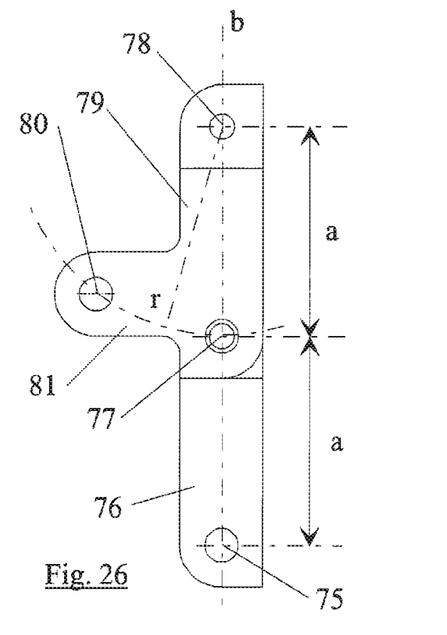
FIG. 26 is a detail of a knuckle joint system.

The geometry of the knuckle joint systems 10, 11 is designed for a fast closing movement. FIG. 26 shows that the distances a, a between the first rotational axis 75 of lever 76 and the second rotational axis 77 and between this rotational axis 77 and the third rotational axis 78 of knuckle lever 79 are equal in knuckle joint system 11.

Further, the second rotational axis 77 and the fourth rotational axis 80 via which the extending leg 81 of knuckle lever 79 is connected to the connection lever not shown in FIG. 26 lie on a circular path r around the third rotational axis 78.

Further, the three rotational axes 75, 77, 78 lie on a line b when dies 5, 7 are closed.

Receptacles 38, 85 are adjustable in height (see FIGS. 23, 24) for adapting to workpieces and dies 5, 7 of different sizes. Height adjustability may also be considered with respect to cylinder 8, but height adjustability of this kind is not compulsory provided the stroke of the cylinder 8 is sufficiently large.

For the height adjustability of receptacles 38, 85, the latter are arranged at the free end of threaded spindles 86, 87, preferably with a trapezoidal thread, which are engaged in the upper flange 4 so as to be adjustable in height.

Figure 25:
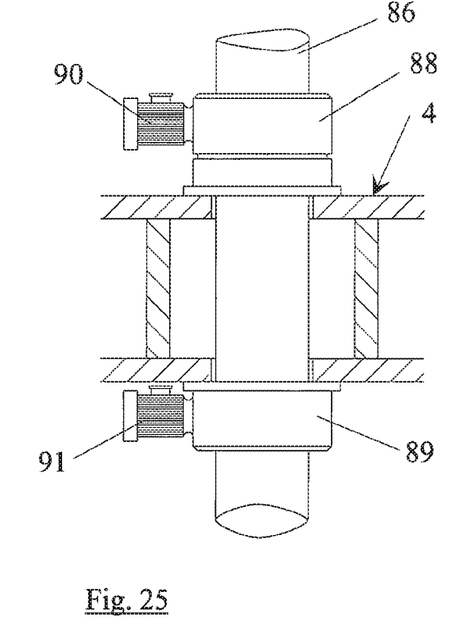
FIG. 25 is a schematic view of the connection of a threaded spindle to the upper flange.

In FIG. 25, the threaded spindles 86, 87 are guided in two spindle nuts 88, 89, shown in an implied manner, which enclose the upper flange 4. The vertical adjustment of threaded spindle 86 is carried by two motors 90, 91, for example, very accurately controllable stepping motors.

Figure 23:
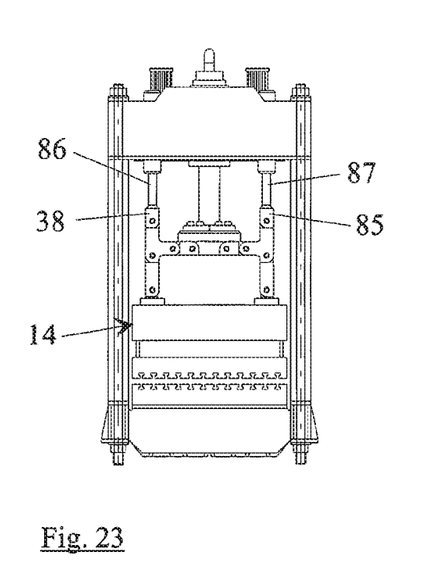
FIG. 23 is a front view with a hydraulic cushion in a bottommost position.
Figure 24:
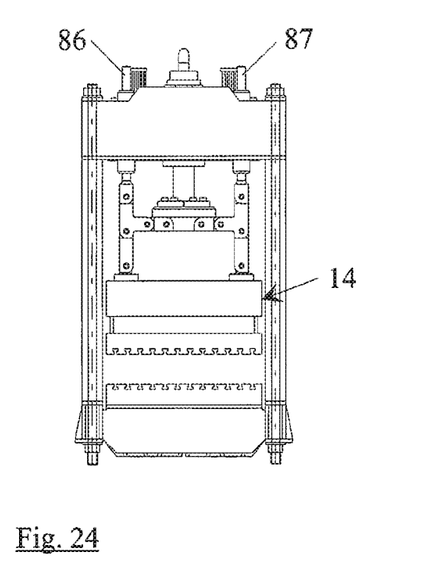
FIG. 24 is a front view with a hydraulic cushion in a topmost position.

Through synchronous adjustment of the threaded spindles 86, 87 in the embodiment example 4, the hydraulic cushion 14 can be moved out of a lower position shown in FIG. 23 into an upper position shown in FIG. 24 in which the threaded spindles 86, 87 project upward from the upper flange 4.

Beyond this, FIG. 25 shows that the forces occurring when the hydraulic cushion 14 is closed at the conclusion of the forming process are transmitted into the upper flange 4 solely along the lower spindle nuts 89 with extended knuckle joint systems 10, 11. A loading of the cylinder 8 does not take place.

Figure 15:
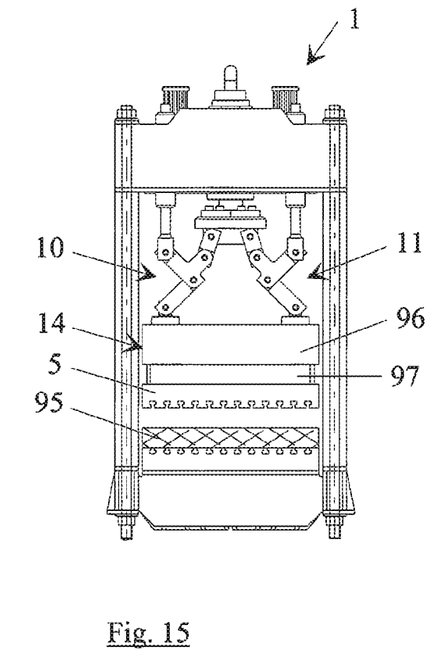
FIG. 15 is a front view of an opened press.

FIG. 15 shows the press 1 with knuckle levers 10, 11 shortened as far as possible over a workpiece 95. Therefore, the hydraulic cushion 14 is in a topmost position over the workpiece 95.

Figure 20:
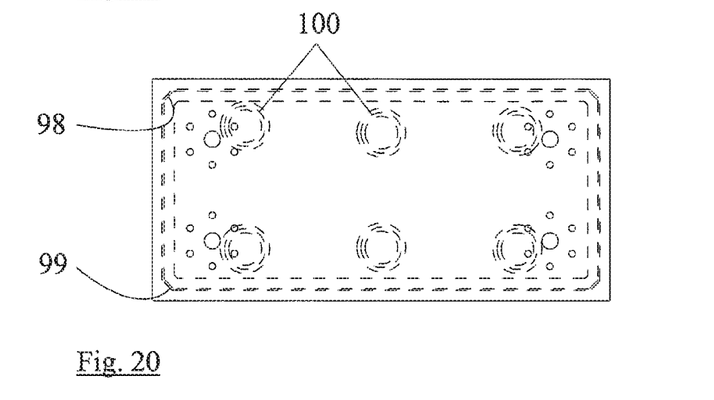
FIG. 20 is a top view.
Figure 21:
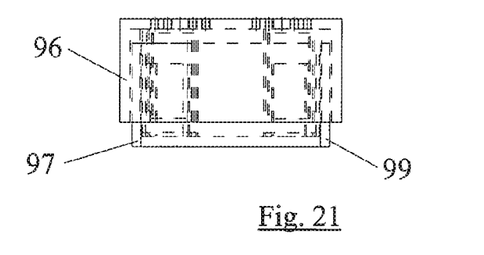
FIG. 21 is a front-side view.
Figure 22:
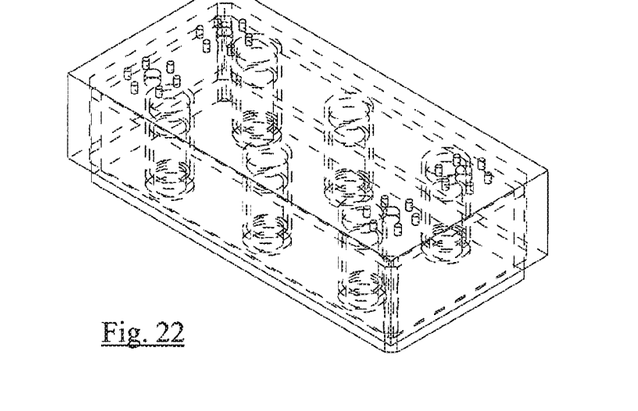
FIG. 22 is an isometric view.

The hydraulic cushion 14 (see also FIGS. 19-22) has an outer box 96 in which an inner box 97 is guided. For guiding, beveled inner corners 98 of the outer box 96 and beveled outer corners 99 of the inner box 97 are indicated in FIG. 20.

Alternatively or in addition, additional guide strips and grooves can be provided.

In the embodiment example of the hydraulic cushion 14, six cylinders 100 are shown arranged between the cover 101 of the outer box 96 and the base 102 of the inner box 97.

At the start of a forming process, the cylinders 100 according to FIG. 15 are moved out. Therefore, the upper die 5 is not in its topmost position.

Figure 16:
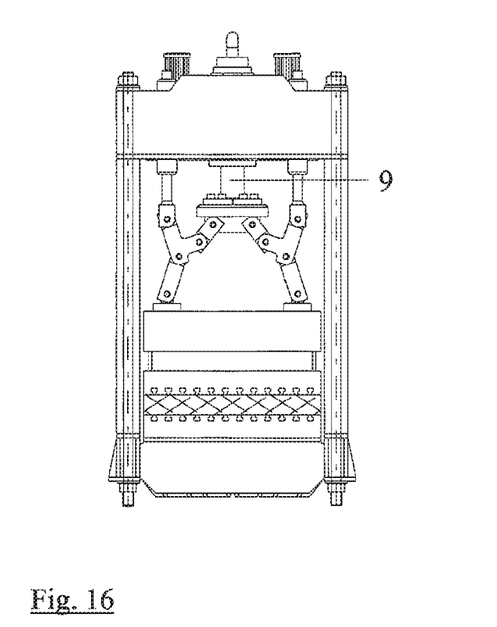
FIG. 16 is the upper die impinging on a workpiece during the closing of the press.

With the lowering of the piston 9 and the consequent extension of the knuckle joint systems 10, 11, the upper die 5 impinges on the workpiece 95 according to FIG. 16 during a forming process.

Figure 17:
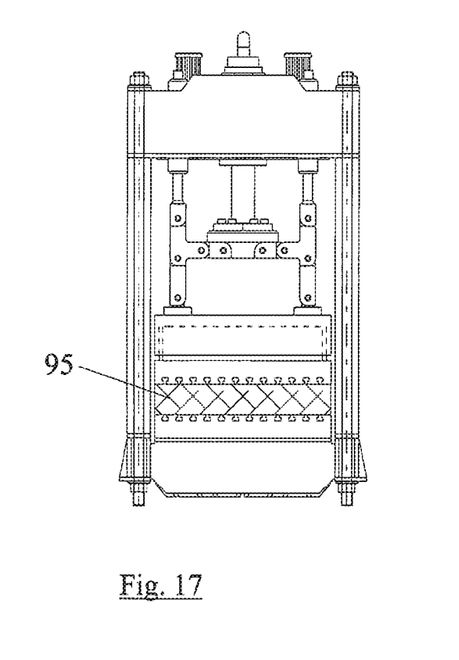
Figure 18:
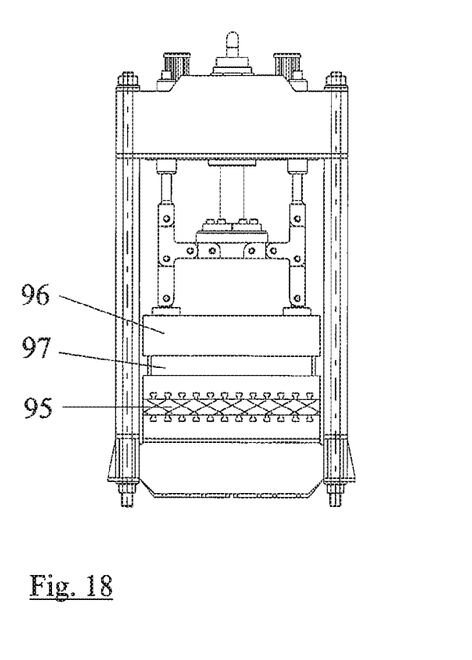
FIG. 18 is the position of the press after the conclusion of the forming process.
Figure 19:
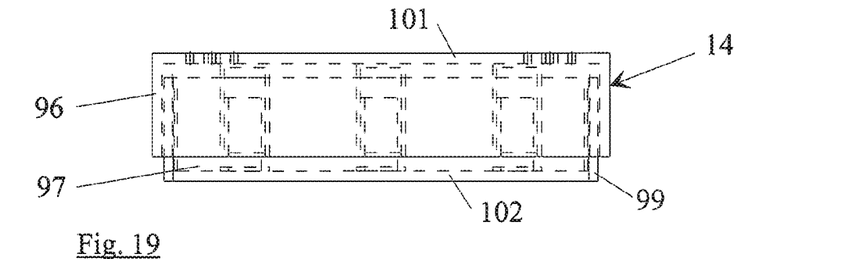
FIG. 19 is a side view of a hydraulic cushion.

With a further extension of the knuckle joint systems 10, 11 into the position shown in FIG. 17, in which the knuckle joint systems 10, 11 support the hydraulic cushion 14 in a straight line against the upper flange 4, the inner box 97 is moved into the outer box 96. As a result of the impingement of pressure by piston 100, the inner box 97 moves out again and the forming process is concluded according to FIG. 18.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A forming process using a press having, in a frame, a ram configured to close through a force of a cylinder with a moveable piston, against a press table in a straight-line movement, the cylinder having a moveable piston, comprising:
   beginning the closing process closing the press, wherein the moveable piston acts upon at least one knuckle joint system; and
   concluding the closing process by a hydraulic cushion of the ram with extension of the knuckle joint system in a movement direction of the piston and straight-line support thereof against the frame;
   moving the hydraulic cushion out initially during the closing of the press;
   moving the hydraulic cushion in with impingement on a workpiece; and
   moving the hydraulic cushion out after extension of the at least one knuckle joint system to conclude the forming process.

2. A press comprising:
   a frame;
   a cylinder with a moveable piston;
   a press table;
   a ram arranged in the frame and configured to close through a force of the cylinder against the press table in a straight-line movement and having a hydraulic cushion; and
   at least two identically constructed knuckle joint systems configured to connect the ram to be fixed with respect to the frame, wherein each of the at least two identically constructed knuckle joint systems comprises:
      a lever having a first end and a second end, the lever connected at the first end via a first rotational axis to the ram;
      a T-shaped knuckle lever connected at a first end of a continuous leg to the second end of the lever via a second rotational axis,
      the continuous leg is connected at a second end opposite the first end in a receptacle that is fixed with respect to the frame via a third rotational axis,
      wherein the three rotational axes are arranged in a line in a movement direction of the ram in a closed position of the press,
      a connection lever connected at a first end to the one piston via a fifth rotational axis,
      a free end of the extending leg of the T-shaped knuckle lever is connected via a fourth rotational axis to a second end of the connection lever;
      wherein front sides of the first end of the continuous leg of the knuckle lever are supported on respective front sides of the lever and the receptacle,
      wherein the first end lever is supported on a correspondingly formed surface of the ram, which has a hydraulic cushion, and
      wherein in the closed position of the press, a flat side of the connection lever contacts an undersides of a platform that is fixed with respect to the piston.

3. The press according to claim 2, wherein a height of the receptacle over the press table is adjustable by height adjustment elements.

4. The press according to claim 3, wherein the height adjustment elements are threaded spindles and wherein the receptacle is arranged at a free end of a respective threaded spindle that extends in movement direction of the ram.

5. The press according to claim 4, wherein at least three knuckle joint systems are arranged so as to have a uniform pitch on a circular path centrally over the ram with inwardly directed, extending legs of the knuckle levers, and the free ends of the knuckle levers are connected via the connection lever to a common platform that is fixed with respect to the piston.

6. The press according to claim 2, comprising:
   at least two knuckle joint systems arranged with respective free ends of the extending legs of the T-shaped knuckle levers directed towards one another over the ram, and the respective free ends of the extending legs of the T-shaped knuckle levers are connected via respective connection levers to a common platform which is fixed with respect to the piston.

7. The press according to claim 5, further comprising webs to which the connection lever are rotatably connected, wherein the webs project from an underside of the platform.

8. The press according to claim 2, wherein connections between one or more levers, receptacles and webs are formed in a pincer-like manner in that a first part of the lever to be connected is enclosed by two brackets of the second part of the knuckle lever, which is partially U-shaped in cross section, and in that the two parts are connected by a pin in aligned bore holes as rotational axis.

9. The press according to claim 8, wherein
   one end of the first portion is weakened to form a neck and is provided with a rounding, in that two flat sides that extend perpendicular to the neck are formed by the weakening, and
   front sides of the brackets of the second portion are provided with roundings lie on the flat sides in a closed position of the press,
   during an opening or closing of the press and a resulting deflection of the portions toward one another, the roundings of the brackets roll on the flat sides and the roundings of the necks roll on a groove base formed by the brackets and/or roundings on surfaces which are fixed with respect to the piston or with respect to the ram.

10. The press according to claim 6, further comprising webs to which the connection lever is rotatably connected, wherein the webs project from an underside of the platform.

* * * * *